Nov. 26, 1935.  H. V. SNODGRASS  2,021,969

TANK VALVE

Filed Jan. 13, 1934

Inventor.
Harrison V. Snodgrass.
By
William M. Gentle
His Attorney.

Patented Nov. 26, 1935

2,021,969

UNITED STATES PATENT OFFICE 2,021,969

TANK VALVE

Harrison V. Snodgrass, Los Angeles, Calif.

Application January 13, 1934, Serial No. 706,499

1 Claim. (Cl. 251—35)

This invention relates to a valve for portable tanks designed to safety control combustible liquids and vapors that are under pressure, and the principal object is to provide a valve for use with tanks that cannot be easily injured or broken off in handling and shipping the tanks; and to that end I provide a valve that is housed in the tank head with only a rim portion of the housing extending beyond the outer end surface of the tank head.

To that end I provide a plug housing having a valve therein that has metal retaining bands that are arranged to reinforce and protect the peripheral edges of resilient disk packings so that when subjected to pressure the disk packings will not spread or disintegrate and thereby cause a leakage. That is, the metal retaining bands of the valve are arranged to reinforce the outer surfaces and peripheral edges of the resilient packings and to extend over a side portion thereof so that pressure on the valve head for closing the valve or of the material therein cannot break away or disintegrate the packing and thereby cause a leak either through or out of the valve.

Heretofore valves have been constructed so that the pressure on the valve head or of the material being controlled or confined has been applied directly to the resilient packings to cause them to spread out and be broken away at their peripheral edges and thereby cause leaks from the valve passage and around the moving parts of the valve when in use.

Another object of this invention is to provide a valve adapted to meet the present requirements as to safety and capacity in rapidly and profitably filling large cylinders and tanks with highly combustible liquids and vapors; and to that end I construct my valve housing so that it remains a permanent plug in an end of its respective tank or cylinder and has a valve therein that needs only to be opened or closed when the receptacle is to be filled or emptied, thereby saving both time and labor; in addition to which my valve is constructed with a relatively large unobstructed passageway with means for opening the passage to its full capacity for the purpose of transferring these liquids or vapors from storage to suitable containers without leakage in any manner from the valve, or of liability of causing a leakage through the valve by long and constant usage.

Another object of this invention is to protect a valve packing from destruction by the force of liquids or vapor under pressure, which is accomplished by providing the valve with a raised seat over which a metal rim of a movable valve head is telescoped to form a metal to metal contact around the valve seat when the valve is being closed that shuts off the pressure of the liquid or vapor before the resilient packing in the head comes into contact with the valve seat, thereby preventing the force of the material from tearing away the peripheral edges of the packing.

Other objects, advantages and features of invention may appear from the accompanying drawing, the subjoined detailed description and the appended claim.

The accompanying drawing illustrates the invention, in which.

Figure 1:
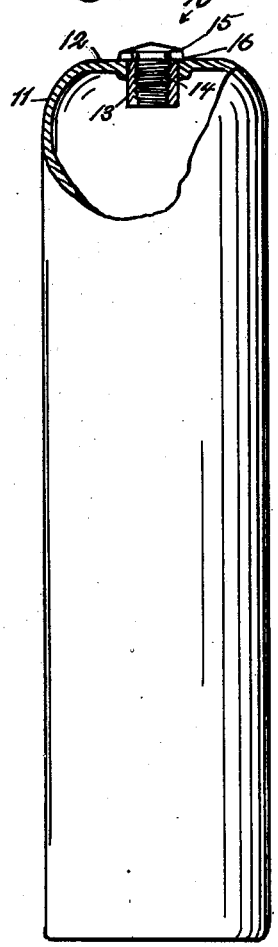
Figure 1 is a perspective view of a tank with the upper portion broken away and in section showing a preferred way of attaching my valve thereto so that the valve cannot be broken off or caused to leak by rough usage or handling of the tank.
Figure 2:
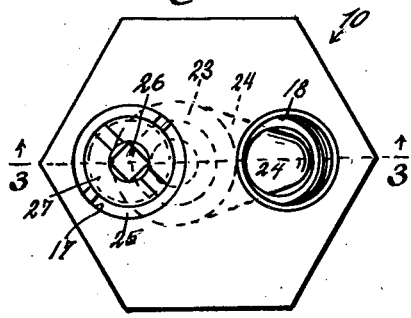
Fig. 2 is an enlarged plan view of the plug housing removed from the cylinder.
Figure 5:
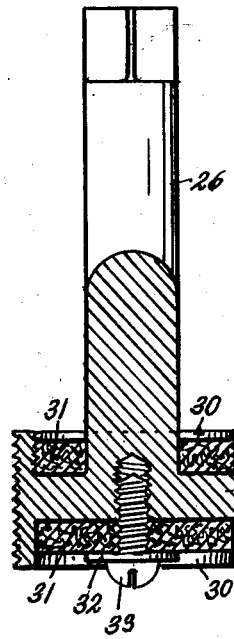
Fig. 5 is an enlarged view of the valve head and stem detached from the valve showing the valve head externally threaded.

In detail my valve 10 shown in Figs. 1 to 5, inclusive, is in the form of a screw-plug housing that is adapted to be attached to a portable tank 11, as shown in Fig. 1, so that only a blunt beveled head extends beyond the outer surface of the tank head 12.

The tank head 12 has a coupling 13 secured therein, as by welding, so that the pipe is wholly within the tank and its upper end flush with the outside surface of the head and welded to positively prevent leakage between the pipe coupling and head.

The pipe coupling 13 is internally threaded to receive the threaded body 14 of my valve housing 10, which, by means of the hexagon shaped head 15, is screwed into the socket of the coupling 13 until the shoulder 16 engages the outer end of the coupling 13 in a gas-tight fit, and so that only the blunt head 15 is extended a short distance beyond the end of the tank 11 so it cannot be easily damaged or broken off by rough usage.

The valve 10 is provided with oppositely arranged sockets 17 and 18 that are inclined from the head 15 inwardly toward a common center, and the socket 17 terminates in a passage 19 through the lower end of the body 14.

The socket 17 has its lower end portion extended to form an annular recess 20 arranged centrally around the passage 19 into which the annular flanged rim 21 of the valve head 22 can extend when the valve is closed. The socket 17 is enlarged just above the annular recess to form an annular chamber 23 around the head 22, and this chamber is in communication with the passage through the socket 18 by the by-pass 24.

The intermediate portion of the wall of the socket 17 is threaded to receive the threads of the valve head 22; and also for the lower threaded portion of the master plug 25 through which the valve stem 26 is extended.

The upper end of the socket 17 is enlarged for the enlarged upper end of the master plug 25 that is hollow and internally threaded for the packing plug 27 that secures the packing ring 28 around the valve stem 26.

The passage 19 and recess 20 are arranged so they form a raised valve seat 29 between them that extends up into the chamber 30 in the valve head 22 into engagement with the resilient packing disk 31 when the valve is closed. Preferably this disk is secured in the lower chamber 30 by a washer 32 and screw 33, and the annular inner wall of the upper chamber is threaded to hold the upper packing in place.

The annular flanged rim 21 on the head 22 is arranged to protect the outer rim and edges of the packing disk 31 when the head is forced down on the raised valve seat 29 to imbed it in the packing. It is understood that the metal rim 21 can be either integral with the valve head or secured to the packing disk 31, as may be desired, and as best shown in the drawings.

In other words, the flanged metal rim 21 prevents the packing disk 31 from being spread, distorted or fractured when heavy pressure is applied on the valve-head 22 to imbed the raised valve seat 29 in the resilient packing 31.

The imbedding of the raised seat in the packing positively prevents leakage of the material through the valve, and also the metal rim 21 prevents the packing from spreading or disintegrating, as stated.

Figure 3:
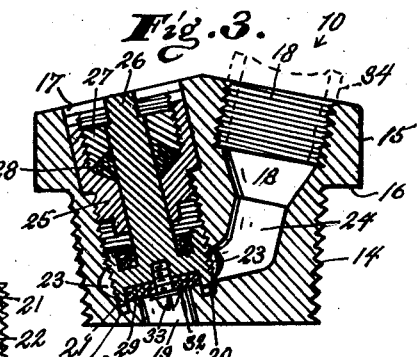
Fig. 3 is a central vertical section on line 3—3, Fig. 2, showing the valve closed and constructed for use with highly combustible liquids and vapors under pressure and also showing the valve housing in the form of a screw plug.
Figure 4:
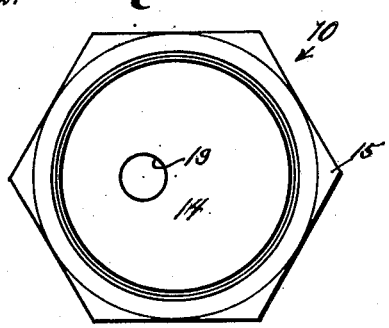
Fig. 4 is a bottom view of the valve shown in Figs. 2 and 3.

As shown by dotted lines in Fig. 3, a pipe-line 34 can be secured in the threaded socket 18 to connect the valve 10 with either a storage tank for filling the portable tank 11 or for connecting the valve to a pipe-line or apparatus for using the liquid or vapor after the storage tank is filled.

The annular metal rim 21 on the valve head 22 is arranged to extend downward beyond the packing 31 so it will telescope over the raised annular valve seat 29 and form a metal to metal shut-off that will stop the high velocity flow of the material passing through the valve before the resilient packing in the valve head engages the raised valve seat. The valve is attached to a tank as shown in the drawing and fully described in the specification; and remains with its respective tank as a relatively permanent fixture; also it is used as described.

I claim as my invention:

A tank valve for use with liquids and vapors under pressure including a screw plug housing adapted to be secured to a tank and having a flange at one end adapted to engage and extending slightly beyond the surface of the tank, said housing having an annular chamber therein and also having oppositely arranged outer end openings that converge inwardly toward a common center, a raised valve seat therein through which a passage is extended into said annular chamber, a removable valve head in one of said converging openings that has a packing chamber therein, a resilient packing in said packing chamber, metallic means connected with said head for telescoping said raised valve seat to form a metal to metal contact therewith to stop the high velocity flow of material passing through said valve before said resilient packing engages said raised valve seat, and a threaded pipe socket in said other converging opening having a passage therethrough that is connected by a bypass with said annular chamber, whereby a tank can be filled or emptied through said plug housing when said valve is opened.

HARRISON V. SNODGRASS.